(12) United States Patent
Kawamura et al.

(10) Patent No.: US 7,686,517 B2
(45) Date of Patent: Mar. 30, 2010

(54) WHEEL BEARING APPARATUS FOR A DRIVING WHEEL

(75) Inventors: Hiroshi Kawamura, Iwata (JP);
Shigeaki Fukushima, Iwata (JP);
Kiyoshige Yamauchi, Iwata (JP);
Masahiro Ozawa, Iwata (JP); Mitsuru Umekida, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/354,833

(22) Filed: Jan. 16, 2009

(65) Prior Publication Data
US 2009/0136168 A1 May 28, 2009

Related U.S. Application Data

(63) Continuation of application No. PCT/JP2007/000756, filed on Jul. 12, 2007.

(30) Foreign Application Priority Data
Jul. 18, 2006 (JP) .............................. 2006-196025

(51) Int. Cl.
*F16C 19/08* (2006.01)
(52) U.S. Cl. .................. 384/448; 384/544; 384/486
(58) Field of Classification Search ......... 384/446–448, 384/486–487, 544; 310/90, 67 R; 324/173–174, 324/207.12–207.25
See application file for complete search history.

(56) References Cited

U.S. PATENT DOCUMENTS

| 6,406,186 B1 * | 6/2002 | Torii et al. | 384/448 |
| 6,588,935 B1 * | 7/2003 | Tajima et al. | 384/544 |
| 6,644,858 B2 * | 11/2003 | Torii et al. | 384/448 |

FOREIGN PATENT DOCUMENTS

| JP | 05-264315 | | 10/1993 |
| JP | 2001199202 A | * | 7/2001 |
| JP | 2001-233010 | | 8/2001 |
| JP | 2001-241435 | | 9/2001 |
| JP | 2005-140146 | | 6/2005 |

* cited by examiner

*Primary Examiner*—Marcus Charles
(74) *Attorney, Agent, or Firm*—Harness, Dickey & Pierce, P.L.C.

(57) ABSTRACT

A wheel bearing apparatus for a driving wheel is formed as a unit of a wheel hub, a double row rolling bearing and a constant velocity universal joint. The double row rolling bearing has an outer member with a body mounting flange mounted on a knuckle and double row outer raceway surfaces. An inner member includes the wheel hub and an outer joint member of the constant velocity universal joint. The wheel hub has an inner raceway surface corresponding to one of the double row outer raceway surfaces. The outer joint member has another inner raceway surface corresponding to the other of the double row outer raceway surfaces. Double row rolling elements are rollably arranged between the outer and inner raceway surfaces. Seals are mounted in an annular space opening formed between the outer member and the inner member. A sensor is fit into a mounting aperture formed in the knuckle. A pulser ring is mounted on the outer circumferential surface of the outer joint member. It opposes the sensor via a predetermined radial gap. The outer diameter of the pulser ring is smaller than the inner diameter of the knuckle.

6 Claims, 5 Drawing Sheets

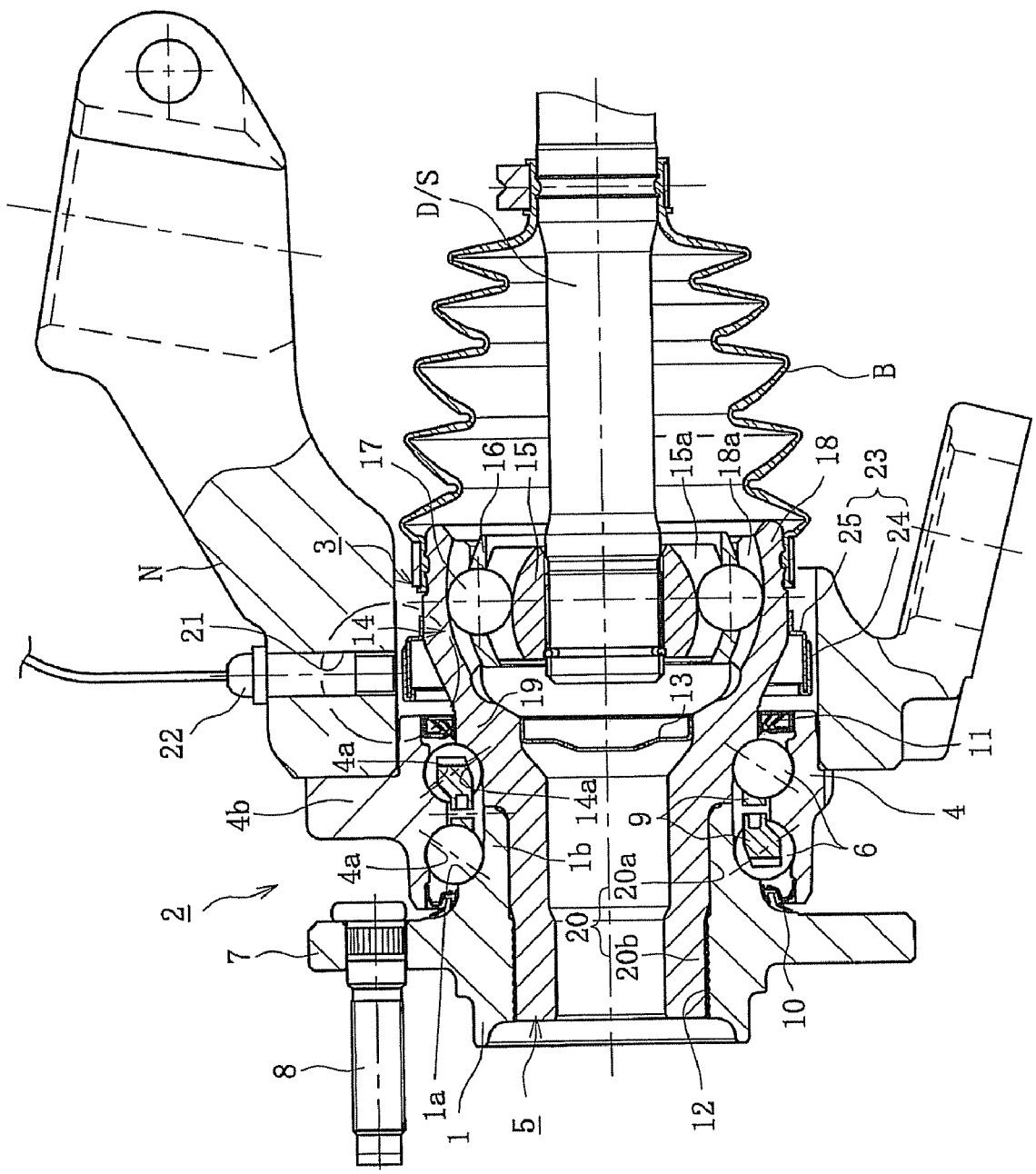
[Fig 1]

[Fig 2]
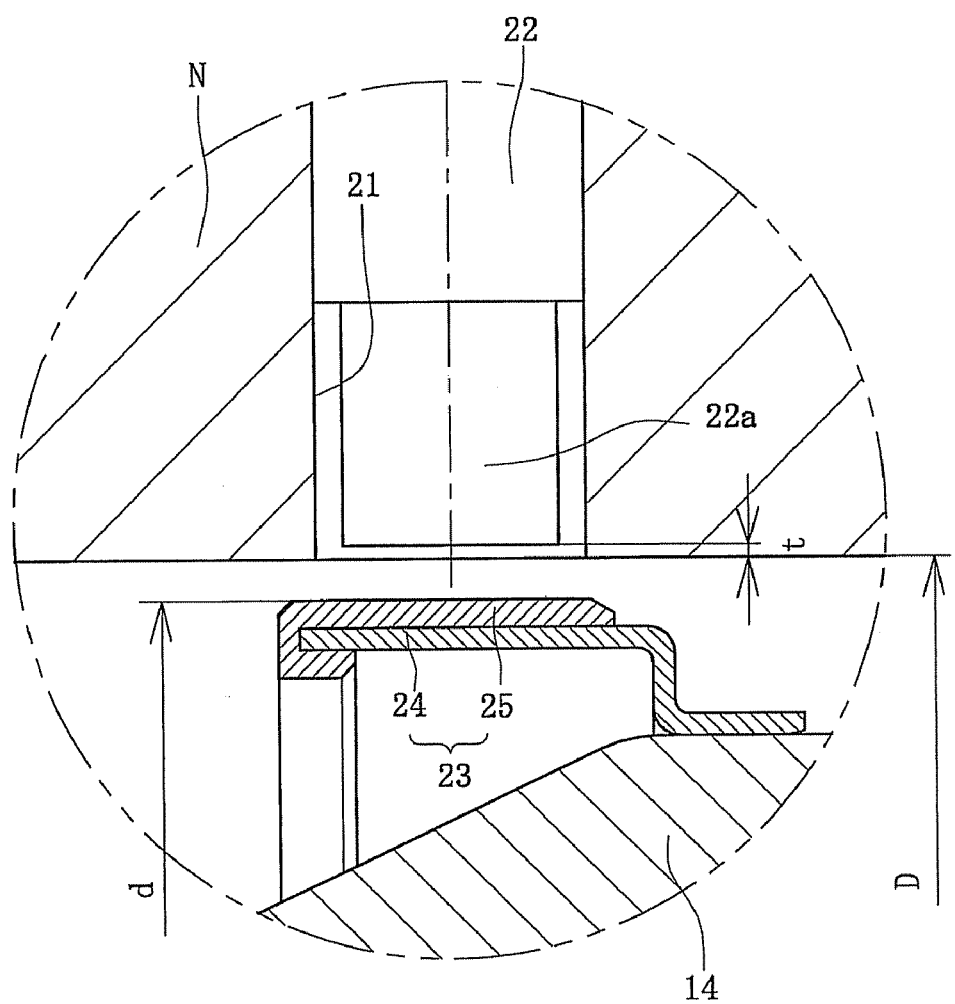

[Fig 3]
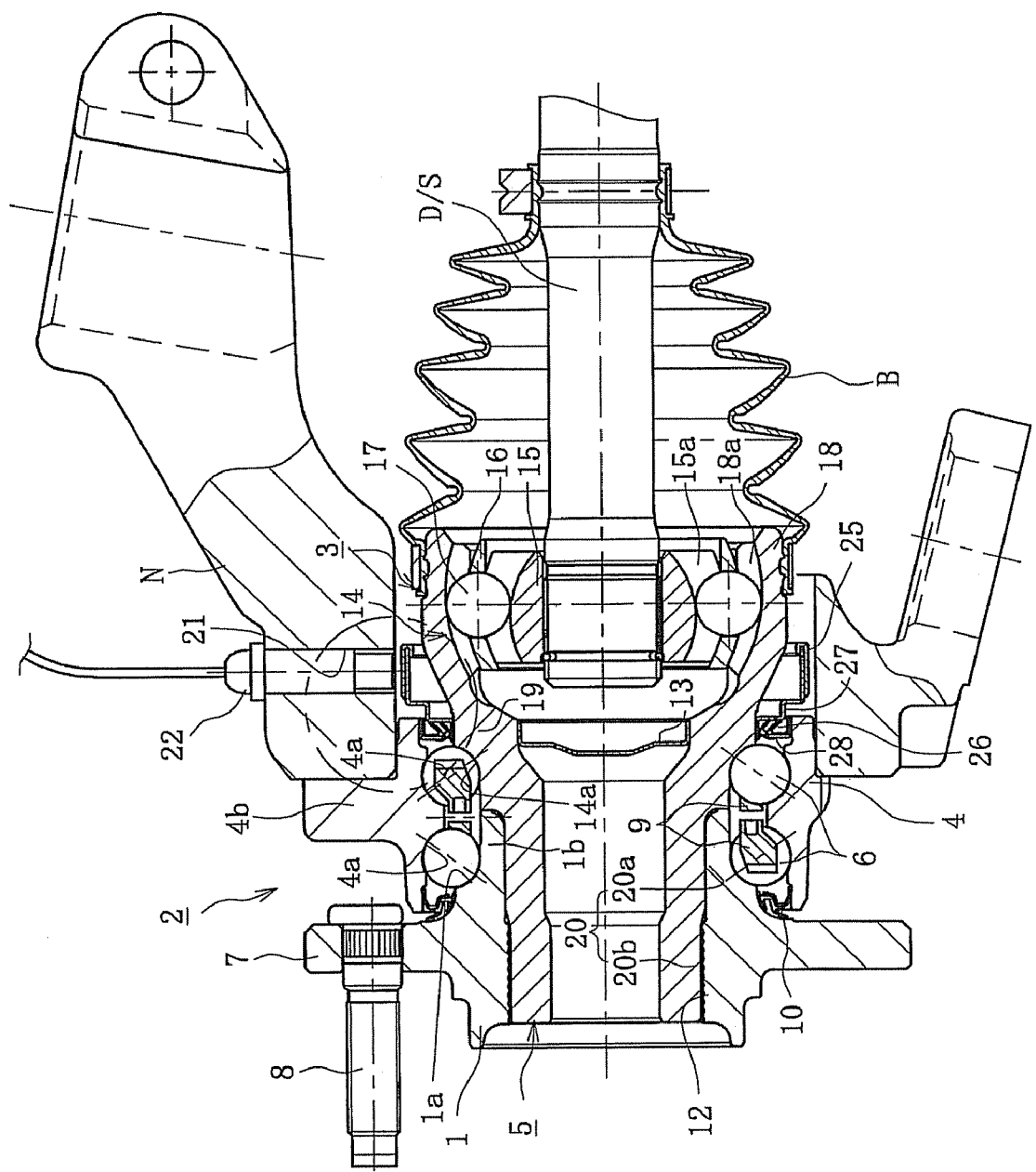

[Fig 4]
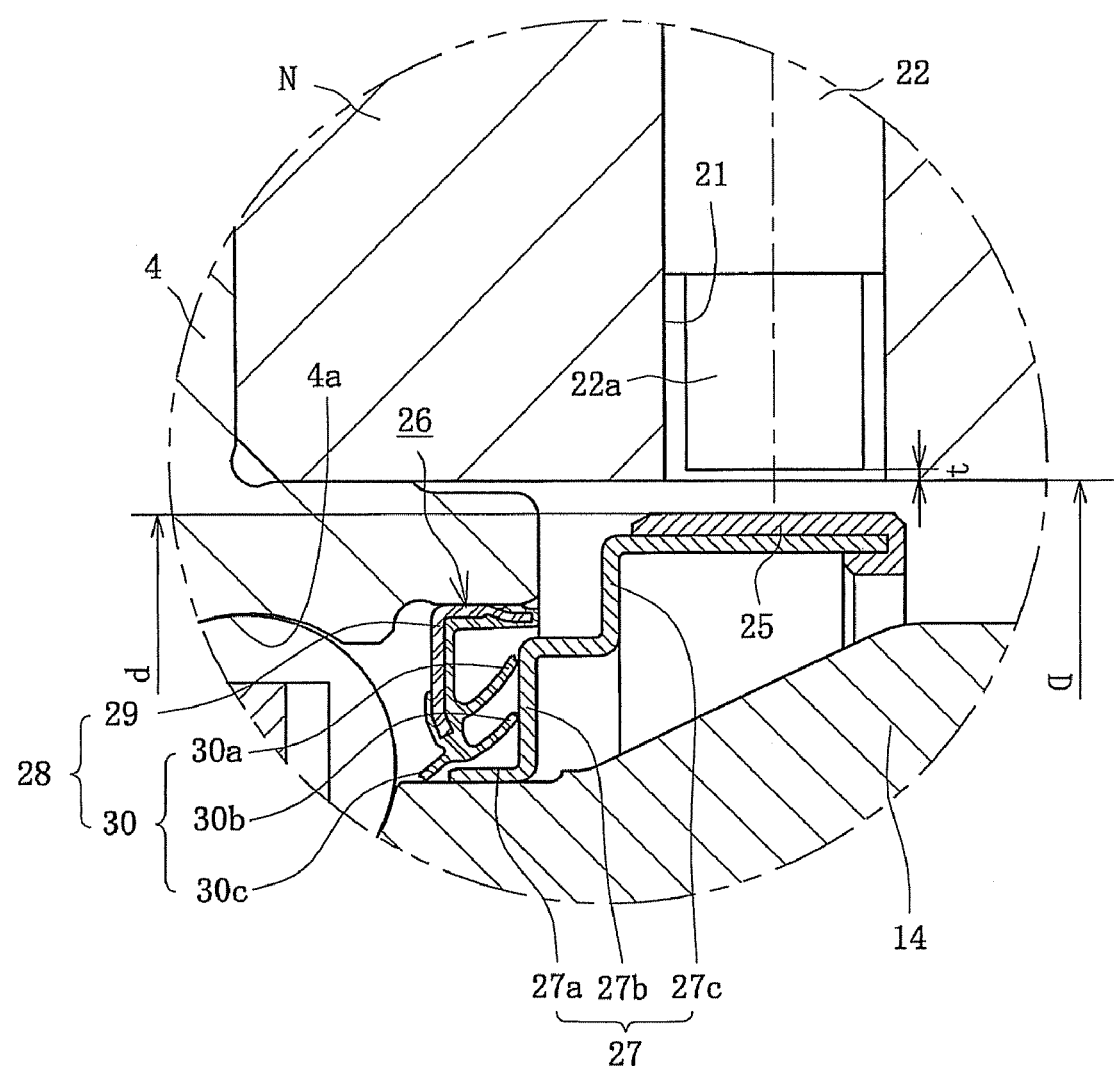

[Fig 5]
PRIOR ART
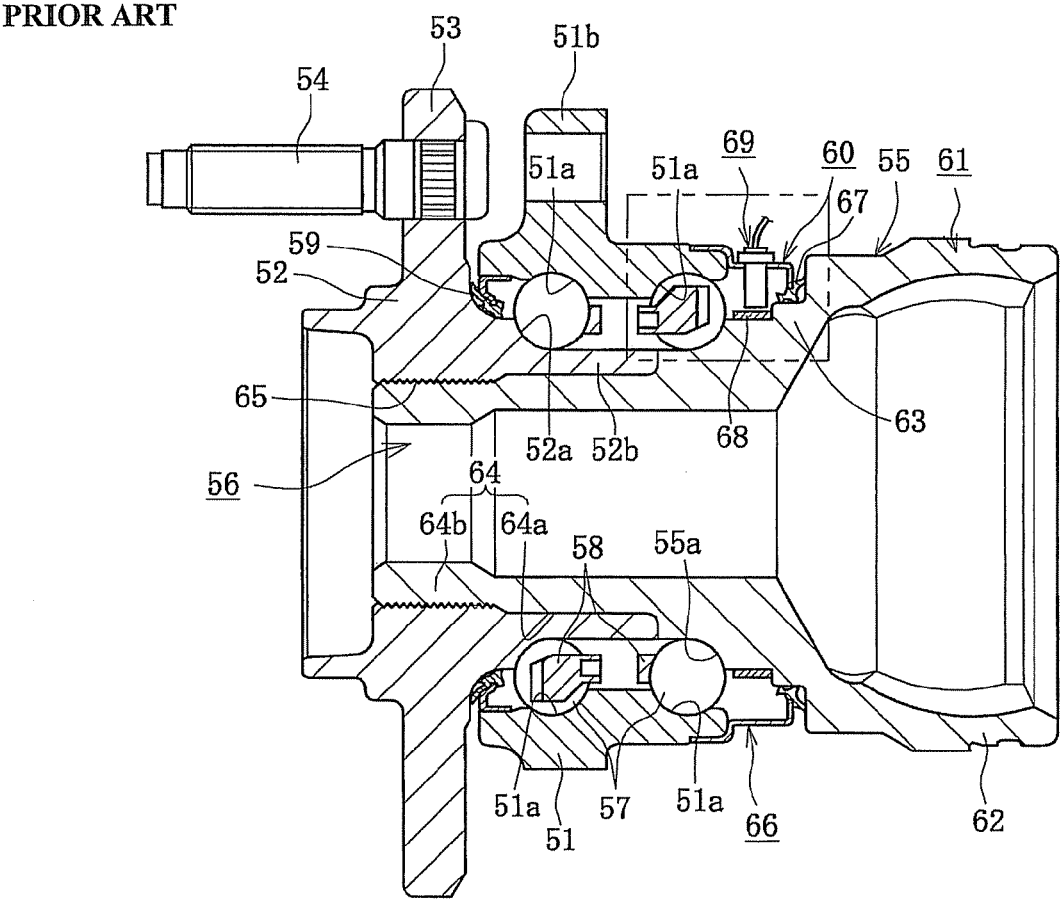
[Fig 6]
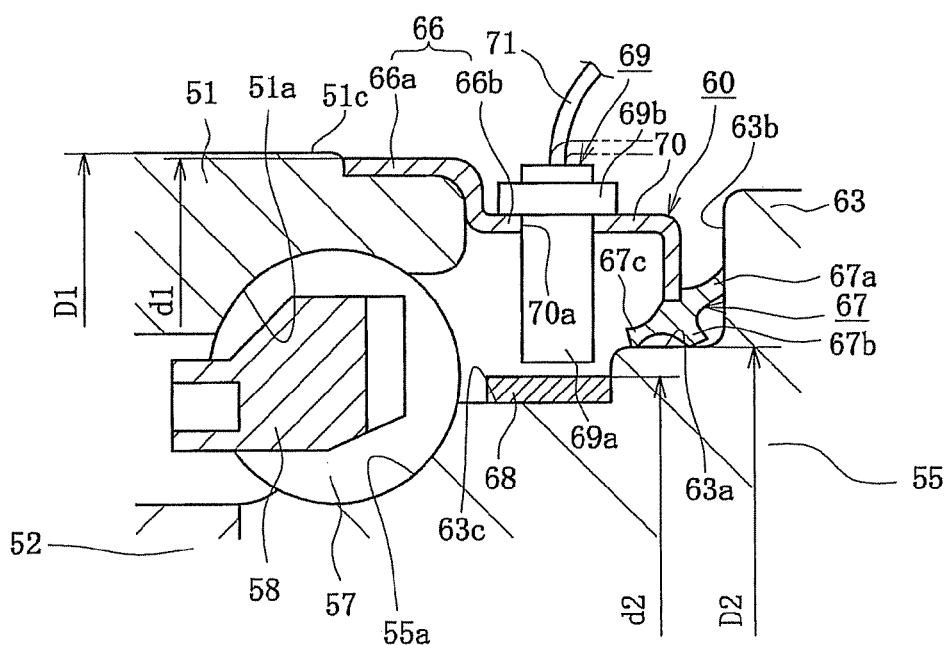

WHEEL BEARING APPARATUS FOR A DRIVING WHEEL

CROSS-REFERENCE TO RELATED APPLICATIONS

This application is a continuation of International Application No. PCT/JP2007/000756, filed Jul. 12, 2007, which claims priority to Japanese Application No. 2006-196025, filed Jul. 18, 2006. The disclosures of the above applications are incorporated herein by reference.

FIELD

The present disclosure relates to a vehicle driving wheel bearing apparatus, such as an automobile, with a wheel speed detecting apparatus to detect a rotation speed of a wheel.

BACKGROUND AND SUMMARY

Wheel bearing apparatus is known that supports a vehicle wheel relative to a suspension apparatus. The wheel bearing apparatus includes a wheel speed detecting apparatus to detect a rotational speed of a wheel to detect the wheel speed to control the anti-lock braking system (ABS). Such a bearing apparatus generally has a wheel speed detecting apparatus with a magnetic encoder. The encoder has magnetic poles alternately arranged along its circumferential direction integrated in a sealing apparatus arranged between inner and outer members that contain rolling elements (balls or rollers). A wheel speed detecting sensor detects variations in the magnetic poles of the magnetic encoder according to the rotation of the wheel.

FIG. 5 is a representative example of such a wheel bearing apparatus for a driving wheel. The wheel bearing apparatus has an outer member 51. It is integrally formed, on its outer circumference, with a body (vehicle body) mounting flange 51b to be mounted on a knuckle (not shown). Its inner circumference includes double row outer raceway surfaces 51a and 51a. An inner member 56 has a wheel hub 52 and an outer joint member 55 of a constant velocity universal joint 61. The wheel hub 52 has a wheel mounting flange 53 integrally formed at one end. A plurality of hub bolts 54, to secure a wheel (not shown), is mounted equidistantly along the flange periphery. The outer circumference of the wheel hub 52 includes an inner raceway surface 52a corresponding to one of the double row outer raceway surfaces 51a and 51a. A cylindrical portion 52b axially extends from the inner raceway surface 52a. The outer joint member 55 is inserted into the cylindrical portion 52b of the wheel hub 52. The outer circumference of the outer joint member 55 includes another inner raceway surface 55a corresponding to the other of the double row outer raceway surfaces 51a and 51a.

Double row rolling elements (balls) 57, held by cages 58, are rollably arranged between the outer raceway surfaces 51a and 51a and inner raceway surfaces 52a and 55a. In addition, seals 59 and 60 are mounted in opening portions of an annular space formed between the outer member 51 and the inner member 56 to prevent leakage of lubricating grease contained within the bearing. The seals 59, 60 prevent rain water or dusts from the outside entering into the bearing.

The outer joint member 55 forms part of the constant velocity universal joint 61. It includes a cup shaped mouth portion 62, a shoulder portion 63, forming the bottom of the mouth portion 62, and a hollow shaft portion 64 that axially extends from the shoulder portion 63. The shaft portion 64 has a spigot portion 64a fit into the cylindrical portion 52b of the wheel hub 52 and a fitting portion 64b at the end of the spigot portion 64a.

An inner circumferential surface of the wheel hub 52 has a hardened irregular portion 65. The shaft portion 64 of the outer joint member 55 is fit into the wheel hub 52. The wheel hub 52 and the outer joint member 55 are integrally connected to each other via plastic deformation. The fitting portion 64b of the shaft portion 64 is expanded radially outward forcing the material of the fitting portion 64b to bite into the hardened irregular portion 65.

The seal 60, arranged at a side of the outer joint member 55, has a cover 66 and a sealing member 67. The cover 66 is generally formed by pressing a steel sheet of SPCC etc. in an annular configuration with a crank shaped cross-section. That is, as shown in an enlarged view of FIG. 6, the cover 66 has a cylindrical portion 66a of larger diameter and a cylindrical portion 66b of smaller diameter. It is fit onto the end 51c of the outer member 51 abutted against the end of the outer member 51.

An outer diameter d1 of the cylindrical portion of larger diameter is set so that it is smaller than an outer diameter D1 of the end portion 51c of the outer member 51 (d1<D1). This enables an inner circumferential edge of the knuckle to be prevented from interfering with the cylindrical portion 66a, of larger diameter, during insertion of the knuckle onto the end portion 51c of the outer member 51.

The sealing member 67 is generally formed of rubber in an annular configuration. It is secured on the cylindrical portion 66b of smaller diameter. Tip ends of a plurality of sealing lips 67a, 67b and 67c are adapted to slidably contact with a cylindrical surface 63a. A stepped surface 63b is formed on a shoulder of the outer joint member 55.

A second cylindrical surface 63c with a diameter smaller than that of the cylindrical surface 63a is formed between the inner raceway surface 55a of the outer joint member 55 and the cylindrical surface 63a. A cylindrical encoder 68 is secured on the second cylindrical surface 63c. The encoder 68 is made of rubber magnetic material with magnetic poles N and S alternately arranged along its circumferential direction. An outer diameter d2 of the encoder 68 is set so that it is smaller than D2 of the cylindrical surface 63a (d2<D2). This enables the encoder 68 to be prevented from interfering with the inner circumferential edge of the sealing member 67 during insertion of the outer joint member 55 into the outer member 51.

A sensor 69 is supported on the cover 66. A flat portion 70 extends along an axial direction of the cover 66. It is formed on the cover at a portion along the circumferential direction of the smaller cylindrical portion 66b of the cover. A radially extending through aperture 70a is formed in the flat portion 70 to mount the sensor 69.

The sensor 69 has a rod shaped inserting portion 69a formed of synthetic resin and a mounting flange 69b arranged at the base end of the inserting portion 69a. A detecting portion is embedded in the tip end of the inserting portion 69a. A wire harness 71, having sufficient flexibility, extends from the base end of the sensor 69.

The inserting portion 69a of the sensor 69 is inserted radially, from outside the cover 66, into the inside of the cover 66 through the mounting aperture 70a. The under side of the mounting flange 69b abuts against the flat portion 70. Under such a condition, the sensor 69 is secured on the cover 66 by a fastening mechanism such as screws. The wheel speed detecting apparatus can be completed by arranging the tip end portion of the inserting portion 69a so that it radially opposes the outer circumferential surface of the encoder 68.

Dimensions of portions relating to the sensor 69 are limited so that the base end portion of the wire harness 71 (shown by a two-dot chain line) does not project radially outward under a condition where the base end portion of the wire harness 71 contacts with the base end surface of the sensor 69. In addition, the position of the sensor 69 can be arranged nearer to the axis of the encoder 68. This reduces the dimension of the outer diameter of the encoder 68. Simultaneously, the dimension of the outer diameter of the cover 66 supporting the sensor 69 can also be reduced.

Accordingly, portions of the seal 60 that include the encoder 68 and the sensor 69 as well as the cover 66 are arranged within a recessed portion opened radially outward between the outer member 51 and the outer joint member 55. Thus, it is possible to detect the rotation of the wheel with high reliability and to reduce the size of the wheel bearing apparatus for a driving wheel having the encoder 68 and the sensor 69 (see Japanese Laid-open Patent publication No. 140146/2005).

In the prior art driving wheel bearing apparatus, the dimension of each portion of the wire harness 71 is limited so that the base end portion of the harness 71 does not project radially outward beyond the end portion 51c of the outer member 51. However, since the wire harness 71 of the sensor 69 sometimes interferes with assembly of the wheel bearing apparatus, it is necessary to insert the outer member 51 into the knuckle with the wire harness 71 being folded. However, this makes the assembly of the wheel bearing apparatus troublesome and thus increases the assembling steps.

In addition, since it is impossible to assemble the wheel bearing apparatus due to interference of the outer joint member 55 with the knuckle after a united connection of the wheel hub 52 and the outer joint member 55, via plastic deformation, it is necessary to previously secure the outer member 51 to the knuckle before the uniting connection of the wheel hub 52 and the outer joint member 55, via plastic deformation. This further complicates the assembly of the wheel bearing apparatus. In addition, this makes it impossible to adopt a system of supplying to an automobile manufacturer with the wheel bearing apparatus as a so-called axle module (a unit of the wheel bearing apparatus, a drive shaft and a constant velocity universal joint at a side of a differential unit (not shown)). Thus, the automobile manufacturer cannot assemble the axle module to the knuckle.

It is, therefore, an object of the present disclosure to provide a wheel bearing apparatus for a driving wheel that improves the workability during assembly by supplying an axle module to an automobile manufacturer.

To achieve the above mentioned object, a wheel bearing apparatus for a driving wheel is provided. It is formed as a unit of a wheel hub, a double row rolling bearing and a constant velocity universal joint. The double row rolling bearing includes an outer member integrally formed, on its outer circumference, with a body mounting flange. The body mounting flange is mounted on a knuckle. The inner circumference of the outer member includes double row outer raceway surfaces. Inner members include a wheel hub and an outer joint member of the constant velocity universal joint. The wheel hub has a wheel mounting flange integrally formed at one end. A cylindrical portion axially extends from the wheel mount flange. The outer circumference of the cylindrical portion has an inner raceway surface corresponding to one of the double row outer raceway surfaces. The outer joint member is formed, on its outer circumference, with another inner raceway surface corresponding to the other of the double row outer raceway surfaces. A hollow shaft portion axially extends from the another inner raceway surface. It is inserted into the wheel hub. Double row rolling elements are rollably arranged between the outer and inner raceway surfaces. Seals are mounted in opening portions of an annular space formed between the outer member and the inner member at its opposite ends. The wheel hub and the outer joint member are integrally connected via plastic deformation. It plastically deforms the shaft portion to caulk it onto the wheel hub. A sensor is radially passed and fit into a mounting aperture formed in the knuckle. A pulser ring is mounted on the outer circumferential surface of the outer joint member. The pulser ring opposes the sensor, via a predetermined radial gap. The outer diameter of the pulser ring is smaller than the inner diameter of the knuckle.

The fourth generation type wheel bearing apparatus for a driving wheel has the wheel hub and the outer joint member united via plastic deformation. A sensor is radially passed and fit into a mounting aperture formed in the knuckle. A pulser ring is mounted on the outer circumferential surface of the outer joint member. It opposes the sensor via a predetermined radial gap. The outer diameter of the pulser ring is smaller than the inner diameter of the knuckle. This wheel bearing apparatus for a driving wheel eliminates troublesome work and improves the workability during assembly. It enables supply, to an automobile manufacturer, of a wheel bearing apparatus as a so-called axle module (a united wheel bearing apparatus, a drive shaft and a constant velocity universal joint at a side of a differential unit). This enables the automobile manufacturer to assemble the axle module to the knuckle.

The pulser ring has an annular supporting member formed by pressing a steel sheet and a magnetic encoder bonded on the annular supporting member. The encoder is formed by an elastomer that is mingled with magnetic powder. It has magnetic poles S, N alternately arranged along its circumferential direction. This makes it possible to reduce the manufacturing cost, weight and size of the wheel bearing apparatus.

The annular supporting member is formed by pressing a stainless steel sheet or a preserved cold rolled sheet. This makes it possible to prevent the generation of rust for a long term. Thus, this improves the durability of the wheel bearing apparatus.

A seal is mounted in an annular space opening formed between the outer member and the outer joint member at its inner side ends. The seal includes an annular sealing plate and a slinger. Each has a substantially L-shaped cross-section and is arranged opposite to each other. The annular supporting member is formed integrally with the slinger. This makes it possible to reduce the number of parts and steps of assembly. Thus, this further improves the workability during assembly.

The sensor is fit in the mounting aperture of the knuckle so that it does not extend beyond the inner diameter of the knuckle. It is retracted from the inner diameter by a predetermined gap. This makes it possible to prevent the magnetic encoder and sensor from being damaged by interference during assembly of the wheel bearing assembly.

The wheel bearing apparatus for a driving wheel is formed as a unit of a wheel hub, a double row rolling bearing and a constant velocity universal joint. The double row rolling bearing has an outer member integrally formed, on its outer circumference, with a body mounting flange. The flange is mounted on a knuckle. The outer member inner circumference includes double row outer raceway surfaces. An inner member has the wheel hub and an outer joint member of the constant velocity universal joint. The wheel hub has a wheel mounting flange integrally formed at one end. A cylindrical portion axially extends from the wheel mounting flange. The outer circumference of the cylindrical portion includes an inner raceway surface corresponding to one of the double row outer raceway surfaces. The outer joint member has, on its outer circumference, the other inner raceway surface corresponding to the other of the double row outer raceway surfaces. A hollow shaft portion axially extends from the other inner raceway surface and is inserted into the wheel hub. Double row rolling elements are rollably arranged between the outer and inner raceway surfaces. Seals are mounted in an annular space opening formed between the outer member and the inner member at their opposite ends. The wheel hub and the outer joint member are integrally connected via plastic deformation. The plastic deformation of the shaft portion caulks it onto the wheel hub. A sensor is radially passed and fit in a mounting aperture formed in the knuckle. A pulser ring is mounted on the outer circumferential surface of the outer joint member. It opposes the sensor via a predetermined radial gap. The outer diameter of the pulser ring is smaller than the inner diameter of the knuckle. Accordingly, it is possible to provide a wheel bearing apparatus for a driving wheel that eliminates troublesome work, improves workability during assembly, and supplies a so-called axle module to an automobile manufacturer. This enables the automobile manufacturer to assemble the axle module to the knuckle.

A wheel bearing apparatus for a driving wheel is formed as a unit with a wheel hub, a double row rolling bearing and a constant velocity universal joint. The double row rolling bearing includes an outer member integrally formed, on its outer circumference, with a body mounting flange. The flange is mounted on a knuckle. The outer member inner circumference includes double row outer raceway surfaces. An inner member includes a wheel hub and an outer joint member of the constant velocity universal joint. The wheel hub has a wheel mounting flange integrally formed at one end. A cylindrical portion axially extends from the wheel mount flange. The outer circumference of the cylindrical portion includes an inner raceway surface corresponding to one of the double row outer raceway surfaces. The outer joint member is formed, on its outer circumference, with another inner raceway surface corresponding to the other of the double row outer raceway surfaces. A hollow shaft portion axially extends from the other inner raceway surface and is inserted into the wheel hub. Double row rolling elements are rollably arranged between the outer and inner raceway surfaces. Seals are mounted in an annular space opening formed between the outer member and the inner member at opposite ends. The wheel hub and the outer joint member are integrally connected via plastic deformation. Plastic deformation of the shaft portion caulks it onto the wheel hub. A sensor is radially passed and fit into a mounting aperture formed in the knuckle. A pulser ring is mounted on the outer circumferential surface of the outer joint member. It opposes the sensor via a predetermined radial gap. The pulser ring includes an annular supporting member formed by pressing a steel sheet. A magnetic encoder is bonded on the annular supporting member. The encoder is formed by an elastomer that is mingled with magnetic powder. It has magnetic poles S, N alternately arranged along its circumferential direction. The outer diameter of the pulser ring is smaller than the inner diameter of the knuckle.

DRAWINGS

The drawings described herein are for illustrative purposes only of selected embodiments and not all possible implementations, and are not intended to limit the scope of the present disclosure.

FIG. 1 is a cross-section view of a wheel bearing apparatus in accordance with the disclosure.

FIG. 2 is an enlarged cross-section view within the circle of FIG. 1.

FIG. 3 is a cross-section view of a second embodiment of a wheel bearing apparatus.

FIG. 4 is an enlarged cross-section view within the circle of FIG. 3.

FIG. 5 is a cross-section view of a prior art wheel bearing apparatus.

FIG. 6 is an enlarged view within the square of FIG. 5.

DETAILED DESCRIPTION

Preferred embodiments of the present disclosure will be described with reference to the accompanied drawings.

FIG. 1 is a longitudinal-section view of a first embodiment of a wheel bearing apparatus for a driving wheel. FIG. 2 is a partially enlarged longitudinal-section view of FIG. 1. In the description, an outer side of a bearing apparatus when it is mounted on a vehicle is referred to as an outer side (left side in drawings). An inner side of a bearing apparatus when it is mounted on a vehicle is referred to as an inner side (right side in drawings).

The driving wheel bearing apparatus is formed as a unit of a wheel hub 1, double row rolling bearing 2 and a constant velocity universal joint 3. Thus, it has a structure of a so-called fourth generation type wheel bearing apparatus. The double row rolling bearing 2 includes an outer member 4, an inner member 5 and double row rolling elements (balls) 6, 6. The outer member 4 is made of medium carbon steel such as S53C including carbon of 0.40~0.80% by weight. It is integrally formed on its outer circumference with a body mounting flange 4b. The body mounting flange 4b is adapted to be mounted on a knuckle N of a vehicle forming a suspension apparatus. The outer member inner circumference includes double row outer raceway surfaces 4a, 4a. At least the double row outer raceway surfaces 4a, 4a are hardened by high frequency induction hardening to have a surface hardness of 58~64 HRC.

The inner member 5 includes the wheel hub 1 and an outer joint member 14 to be inserted into the wheel hub 1 as hereinafter described. The wheel hub 1 is made of medium carbon steel such as S53C including carbon of 0.40~0.80% by weight. It has at its outer side end a wheel mounting flange 7 to mount a wheel (not shown). A plurality of hub bolts 8 are equidistantly arranged along the periphery of the wheel mounting flange 7. The wheel hub 1 has, on its outer circumference, one inner raceway surface (outer side inner raceway surface) 1a, arranged opposite to one of the double row outer raceway surfaces 4a, 4a, and a cylindrical portion 1b. The wheel hub 1 is formed with a hardened layer by high frequency induction hardening to have a surface hardness of 58~64 HRC. The hardened layer extends from a seal land portion, where an outer side seals 10 sliding contacts, to the inner raceway surface 1a and the cylindrical portion 1b. This not only improves the anti-friction characteristics of the seal land portion at the base of the wheel mounting flange 7 but improves the durability of the wheel hub 1. It provides a sufficient mechanical strength against the rotary bending load applied to the wheel mounting flange 7.

The constant velocity universal joint 3 includes the outer joint member 14, a joint inner ring 15, cage 16 and torque transmitting balls 17. The outer joint member 14 is made of medium carbon steel such as S53C including carbon of 0.40~0.80% by weight. It includes a cup shaped mouth portion 18, a shoulder portion 19, forming the bottom of the mouth portion 18, and a cylindrical shaft portion 20 that axially extends from the shoulder portion 19. They are integrally formed with each other. The shaft portion 20 is formed with a cylindrical spigot portion 20*a* fit into the cylindrical portion 1*b* of the wheel hub 1 via a predetermined interference. A fitting portion 20*b* is at the end of the spigot portion 20*a*.

An inner surface of the mouth portion 18 is formed with axially extending curved track grooves 18*a*. An outer surface of the joint inner ring 15 is formed with track grooves 15*a* that correspond to the track grooves 18*a*. An outer circumferential surface of the shoulder portion 19 is formed with inner raceway surface (inner side inner raceway surface) 14*a* corresponding to another one of the double row raceway surfaces 4*a*, 4*a*. A hardened layer is formed by high frequency induction heating and has a surface hardness of HRC 58~64. A hardened region extends from a seal land portion, where the inner side seals 11 slidingly contacts, to the inner raceway surface 14*a* and the shaft portion 20 and track grooves 18*a*, 15*a*. The fitting portion 20*b* remains as raw material itself without being hardened after having been forged.

Double row rolling elements (balls) 6, 6 are arranged between the double row outer raceway surfaces 4*a*, 4*a* of the outer member 4 and corresponding double row inner raceway surfaces 1*a*, 14*a* of the inner member 5. The rolling elements 6, 6 are freely rollably held by cages 9, 9. Seals 10, 11 are mounted in an annular space opening formed between the outer member 4 and the inner member 5. The seals 10, 11 prevent leakage of grease contained within the bearing as well as ingress of rain water or dusts into the inside of the bearing. Although shown as a double row angular ball bearing, using balls as the rolling elements 6, 6, the present disclosure is not limited to such an embodiment. Thus, a double row tapered roller bearing, using tapered rollers as the rolling elements, may be used.

The inner circumferential surface of the wheel hub 1 is formed with an irregular portion 12 hardened by high frequency induction heating to have a surface hardness of HRC 54~64. The irregular portion 12 is formed with a crisscross knurl pattern formed by combining a plurality of independent annular grooves and a plurality of axial grooves. The independent grooves are formed by example a lathe. The plurality of axial grooves is formed by for example broaching as orthogonally crossed grooves or mutually inclined helical grooves. Each projection forming the irregular portion 12 may be pointed like a pyramid to increase the biting ability of the irregular portion 12.

The uniting connection of the wheel hub 1 and the outer joint member 14 is performed by inserting the shaft portion 20 into the wheel hub 1. The shoulder 19 of the outer joint member 14 abuts against the end face of the cylindrical portion 1*b* of the wheel hub 1. The fitting portion 20*b* of the shaft portion 20 is expanded radially outward to force the material of the fitting portion 20*b* to bite into the hardened irregular portion 12 of the wheel hub 1 via plastic deformation of the fitting portion 20*b*. This makes it possible to reduce the size and weight of the wheel bearing apparatus and to improve the strength and durability of the wheel hub as well as to maintain its pre-load for a long term.

An end cap 13 is mounted in the end of the hollow shaft 20. A boot B is mounted on an opening at a larger diameter end of the outer joint member 14. The boot B prevents leakage of grease contained within the mouth portion 18. Also, the boot B prevents rain water or dusts from entering into the inside of the joint. In addition, another end cap is also mounted in the opened end of the wheel hub 1. The cap prevents rain water from entering into the wheel hub and thus the generation of rust at the connected portion via the plastic deformation.

Other connecting mechanism may be adopted between the wheel hub 1 and the outer joint member 14. For example, they can be axially secured by inserting the shaft portion of the outer joint member into the wheel hub and then by caulking (a so-called swing caulking) the end of the shaft portion projected from the wheel hub radially outwardly.

In this embodiment a radially extending mounting aperture 21 is formed in the knuckle N. It provides a through aperture into which the sensor 22 is fit. In addition a pulser ring 23 is mounted to the outer circumferential surface of the outer joint member 14. The pulser ring 23 opposes the sensor 22 via a predetermined radial gap (air gap). As shown in an enlarged view of FIG. 2, the pulser ring 23 includes an annular supporting member 24 and a magnetic encoder 25 bonded to the annular supporting member 24.

The annular supporting ring 24 has a generally annular configuration with a crank-shaped cross-section. The ring 24 is formed by plastic working such as pressing, drawing or burring a magnetized metal sheet such as an austenitic stainless steel sheet (JIS SUS 304 etc) or a preserved cold rolled sheet (JIS SPCC etc). This makes it possible to reduce the manufacturing cost, weight and size of the wheel bearing apparatus as well as to prevent the generation of rust for a long term. Thus, this improves the durability of the wheel bearing apparatus. On the other hand, the magnetic encoder 25 is formed by an elastomer such as rubber. It is mingled with magnetic powder and has magnetic poles S, N alternately arranged along its circumferential direction. Additionally, it is integrally bonded to the supporting ring 24 via vulcanized adhesion.

In this embodiment the outer diameter d of the magnetic encoder 25 is set smaller than the inner diameter D of the knuckle N (d<D). The sensor 22 is fit into the mounting aperture 21 of the knuckle N. The tip end (detecting portion) 22*a* of the sensor 22 does not extend beyond the inner diameter D of the knuckle N. The tip end 22*a* is retracted from the inner diameter D by a predetermined gap t. This eliminates troublesome workings and improves the workability during assembly of the wheel bearing apparatus. Also, it prevents any damage to the magnetic encoder 25 and the sensor 22 that would be caused by interference between the two. Furthermore, it is possible to provide a wheel bearing apparatus for a driving wheel that can be supplied to an automobile manufacturer as an axle module. In the axle module of the wheel bearing apparatus, a drive shaft D/S (FIG. 1) and a constant velocity universal joint (not shown) at a side of a differential unit are united to enable the automobile manufacturer to assemble the axle module to the knuckle N.

Although the magnetic encoder 25 is illustrated including a rubber magnet as the pulser ring 23, it may be possible to use a sintered magnet or a comb type or ladder type magnet (not shown) that is formed with an annular configuration by pressing a steel sheet. It is provided with a plurality of through apertures (portions to be detected) equidistantly along its circumferential direction. It may be also formed of sintered metal where projections and recesses are equidistantly arranged along its circumferential direction. In addition, although it is exemplary illustrated that the sensor 22 includes a magnetic detecting element, such as a Hall element, a magnetic resistance element (MR element) etc, for changing its characteristics in accordance with the flowing direction of magnetic flux, and an IC incorporated with a wave forming circuit for rectifying the output wave form of magnetic detecting element may be used. The present disclosure is not limited to such a structure and an active type or a passive type sensor may be used in combination with the pulser ring 23.

FIG. 3 is a longitudinal-section view of a second embodiment of a wheel bearing apparatus for a driving wheel. FIG. 4 is a partially enlarged longitudinal-section view of FIG. 3. Since this second embodiment only differs from the first embodiment in the structure of the pulser ring, the same reference numerals are used in this embodiment to designate the same parts having the same functions as those used in the first embodiment.

In this embodiment the magnetic encoder 25 is integrally bonded to a slinger 27 that forms an inner side seal 26. The seal 26 is mounted in an annular space opening formed between the outer member 4 and the outer joint member 14. The slinger 27 of the seal 26 is press fit onto the outer circumferential surface of the shoulder 19 of the outer joint member 14. As shown in the enlarged view of FIG. 4, the seal 26 includes the slinger 27 and an annular sealing plate 28. The slinger 27 is formed by pressing an austenitic stainless steel sheet (JIS SUS 304 etc) or a preserved cold rolled sheet (JIS SPCC etc). It includes a cylindrical portion 27a press fit onto the outer joint member 14. An upstanding portion 27b extends radially outward from the cylindrical portion 27a. A supporting portion 27c extends from the tip of the upstanding portion 27b. The slinger 27 has a crank shaped cross-section.

The sealing plate 28 includes a metal core 29 and a sealing member 30 bonded to the metal core 29 via vulcanized adhesion. The sealing plate 28 is formed as an annular member having a substantially L-shaped cross-section. The metal core 29 is formed by pressing an austenitic stainless steel sheet (JIS SUS 304 etc) or a preserved cold rolled sheet (JIS SPCC etc).

The sealing member 30 is formed from an elastic member such as nitrile rubber. The sealing member 30 has first and second side lips 30a and 30b in sliding contact with the upstanding portion 27b of the slinger 27. A radial lip 30c is in direct sliding contact with the shoulder 19 of the outer joint member 14. Each of the first and second side lips 30a and 30b has a cross-section extending radially outward. Their tips are in sliding contact with the upstanding portion 27b of the slinger 27 via a predetermined interference. The magnetic encoder 25 is bonded to the supporting portion 27c of the slinger 27. The encoder 25 is arranged opposite to the tip end 22a of the sensor 22 via a predetermined radial gap.

Similar to the first embodiment, the outer diameter d of the magnetic encoder 25 is set smaller than the inner diameter D of the knuckle N (d<D). The sensor 22 is fit in the mounting aperture 21 of the knuckle N. The tip end (detecting portion) 22a of the sensor 22 does not extend beyond the inner diameter D of the knuckle N. The tip end 22a is retracted from the inner diameter D by a predetermined gap t. This enables the wheel bearing apparatus to be supplied to an automobile manufacturer as an axle module. Thus, the automobile manufacturer is able to assemble the axle module to the knuckle N as well as to prevent any damage of the magnetic encoder 25 and the sensor 22 that would be caused by interference between the two. Furthermore, since the magnetic encoder 25 is integrally formed with the slinger 27 of the seal 26, it is possible to reduce the number of structural parts and manufacturing steps. This further improves the workability during assembly.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

The wheel bearing apparatus for a driving wheel of the present disclosure can be applied to wheel bearing apparatus for a driving wheel of a fourth generation type where the wheel hub and the constant velocity universal joint are united by a connection via plastic deformation.

What is claimed is:

1. A wheel bearing apparatus for a driving wheel comprising:
    a unit of a wheel hub, a double row rolling bearing and a constant velocity universal joint, said double row rolling bearing further comprising an outer member integrally formed, on its outer circumference, with a body mounting flange, said body mounting flange to be mounted on a knuckle, said outer member inner circumference includes double row outer raceway surfaces;
    an inner member including the wheel hub and an outer joint member of the constant velocity universal joint, said wheel hub having a wheel mounting flange formed integrally at one end, a cylindrical portion axially extends from the wheel mount flange, an inner raceway surface is formed on an outer circumference of the cylindrical portion, the inner raceway surface corresponds to one of the double row outer raceway surfaces, the outer joint member is formed, on its outer circumference, with another inner raceway surface corresponding to the other of the double row outer raceway surfaces, a hollow shaft portion axially extends from said another inner raceway surface of said outer joint member to be inserted into the wheel hub;
    double row rolling elements are rollably arranged between the outer and inner raceway surfaces;
    seals are mounted in annular space openings formed between the outer member and the inner member at their opposite ends;
    the wheel hub and the outer joint member are integrally connected via plastic deformation by plastically deforming the shaft portion of the outer joint member to bite into the wheel hub;
    a sensor is radially passed and fit in a mounting aperture formed in the knuckle; and
    a pulser ring is mounted on an inner side of the bearing apparatus from the inner annular space on the outer circumferential surface of an outer joint member of the constant velocity universal joint so that it opposes the sensor via a predetermined radial gap, an outer diameter of the pulser ring is smaller than an inner diameter of the knuckle and the outer diameter of the constant velocity joint is smaller than the inner diameter of the knuckle.

2. The wheel bearing apparatus for a driving wheel of claim 1 wherein the pulsar ring further comprises an annular supporting member formed by pressing a steel sheet, a magnetic encoder is bonded on the annular supporting member, and the encoder is formed by an elastomer that is mingled with magnetic powder and has magnetic poles S, N alternately arranged along its circumferential direction.

3. The wheel bearing apparatus for a driving wheel of claim 1 wherein the annular supporting member is formed by pressing a stainless steel sheet or a preserved cold roiled sheet.

4. The wheel bearing apparatus for a driving wheel of claim 2 wherein the seal mounted in the annular space opening formed between the outer member and the oar joint member at inner side ends further comprises an annular sealing plate and a slinger each having a substantially L-shaped cross-section and oppositely arranged to each other, and the annular supporting member is formed integrally with the slinger.

5. A wheel bearing apparatus for a driving wheel of claim 1 wherein the sensor is fit in the mounting aperture of the knuckle so that it does not extend beyond the inner diameter of the knuckle and is retracted from the inner diameter by a predetermined gap.

6. A wheel bearing apparatus for a driving wheel comprising:

a unit of a wheel hub, a double row rolling bearing and a constant velocity universal joint, said double row rolling bearing further comprising an outer member integrally formed, on its outer circumference, with a body mounting flange, said body mounting flange to be mounted on a knuckle, said outer member inner circumference includes double row outer raceway surfaces;

an inner member including the wheel hub and an outer joint member of the constant velocity universal joint, said wheel hub having a wheel mounting flange formed integrally at one end, a cylindrical portion axially extends from the wheel mount flange, an inner raceway surface is formed on an outer circumference of the cylindrical portion, the inner raceway surface corresponds to one of the double row outer raceway surfaces, the outer joint member is formed, on its outer circumference, with another inner raceway surface corresponding to the other of the double row outer raceway surfaces, a hollow shaft portion axially extends from said another inner raceway surface to be inserted into the wheel hub;

double row rolling elements are rollably arranged between the outer and inner raceway surfaces;

seals are mounted in annular space openings formed between the outer member and the inner member at their opposite ends;

the wheel hub and the outer joint member are integrally connected via plastic deformation by plastically deforming the shaft portion of the outer joint member to bite into the wheel hub; and a sensor is radially passed and fit in a mounting aperture formed in the knuckle, a pulser ring is mounted on the outer circumferential surface of the outer joint member, said pulser ring includes a supporting ring with a crank shaft cross-section having one end secured with the outer joint member and the other end axially extending from the secured end and a magnetic encoder on the axially extending end of the support ring, said magnetic encoder opposes the sensor via a predetermined radial gap, and an outer diameter of the pulser ring is smaller than an inner diameter of the knuckle.

* * * * *

UNITED STATES PATENT AND TRADEMARK OFFICE
CERTIFICATE OF CORRECTION

PATENT NO.        : 7,686,517 B2                              Page 1 of 1
APPLICATION NO.   : 12/354833
DATED             : March 30, 2010
INVENTOR(S)       : Hiroshi Kawamura et al.

It is certified that error appears in the above-identified patent and that said Letters Patent is hereby corrected as shown below:

Column 10
Claim 3, Line 58 "roiled" should be --rolled--
Claim 4, Line 61 "oar" should be --outer--

Signed and Sealed this

Thirty-first Day of August, 2010

David J. Kappos
*Director of the United States Patent and Trademark Office*